United States Patent
Bussell et al.

(10) Patent No.: US 11,158,137 B1
(45) Date of Patent: Oct. 26, 2021

(54) SHIPPING INTERFACE FOR A USER INTERFACE

(71) Applicant: Stamps.com Inc., El Segundo, CA (US)

(72) Inventors: Keith D. Bussell, Los Angeles, CA (US); Geoffrey C. Begen, Lake Forest, CA (US)

(73) Assignee: Stamps.com Inc., El Segundo, CA (US)

( * ) Notice: Subject to any disclaimer, the term of this patent is extended or adjusted under 35 U.S.C. 154(b) by 707 days.

(21) Appl. No.: 15/660,812

(22) Filed: Jul. 26, 2017

Related U.S. Application Data

(63) Continuation of application No. 11/586,843, filed on Oct. 26, 2006, now Pat. No. 9,761,061.

(51) Int. Cl.
*G06Q 10/08* (2012.01)
*G07B 17/00* (2006.01)

(52) U.S. Cl.
CPC ... *G07B 17/00024* (2013.01); *G06Q 10/0834* (2013.01); *G07B 2017/0033* (2013.01)

(58) Field of Classification Search
CPC .................................................. G06Q 10/0834
See application file for complete search history.

(56) References Cited

U.S. PATENT DOCUMENTS

| | | | |
|---|---|---|---|
| 4,122,532 A | 10/1978 | Dlugos et al. | |
| 4,495,581 A | 1/1985 | Piccione | |
| 4,802,218 A | 1/1989 | Wright et al. | |
| 4,809,185 A | 2/1989 | Talmadge | |
| 4,812,994 A | 3/1989 | Taylor et al. | |
| 4,831,555 A | 5/1989 | Sansone et al. | |
| 4,864,618 A | 9/1989 | Wright et al. | |
| 4,868,757 A | 9/1989 | Gil | |
| 4,900,903 A | 2/1990 | Wright et al. | |
| 4,900,904 A | 2/1990 | Wright et al. | |

(Continued)

OTHER PUBLICATIONS

Oliphant, Creating Netscape Navigator Plug-Ins, Web Programming Chapter 32, WebArchive copy dated Jul. 7, 2002 (Year: 2002).*

(Continued)

*Primary Examiner* — Daniel Vetter
(74) *Attorney, Agent, or Firm* — Norton Rose Fulbright US LLP

(57) ABSTRACT

Systems and methods which provide a shipping interface within a user interface are shown. A shipping interface of embodiments is provided within a open architecture or multiple application user interface, such as a browser user interface. A user may be enabled to use a same shipping account with respect to any number of applications or functions. Moreover, a user may be enabled to select a shipping provider of preference, even where the underlying application or function does not support the selected shipping provider or any shipping functions. Embodiments provide comparison of various shipping providers to a user for selection. Embodiments comprise a browser plug-in operable to provide a shipping interface, such a by inserting one or more shipping buttons within a page displayed by the browser, within a popup window, within a frame along the main browser window, within a browser menu bar, tool tray, etcetera.

30 Claims, 5 Drawing Sheets

(56) References Cited

U.S. PATENT DOCUMENTS

| | | |
|---|---|---|
| 4,901,241 A | 2/1990 | Schneck |
| 4,908,770 A | 3/1990 | Breault et al. |
| 4,980,542 A | 12/1990 | Jackson et al. |
| 5,025,141 A | 6/1991 | Bolan |
| 5,040,132 A | 8/1991 | Schuricht et al. |
| 5,091,771 A | 2/1992 | Bolan et al. |
| 5,111,030 A | 5/1992 | Brasington et al. |
| 5,117,364 A | 5/1992 | Barns-Slavin et al. |
| 5,319,562 A | 6/1994 | Whitehouse |
| 5,481,464 A | 1/1996 | Ramsden |
| 5,485,369 A | 1/1996 | Nicholls et al. |
| 5,510,992 A | 4/1996 | Kara |
| 5,544,249 A | 8/1996 | Mandelbaum et al. |
| 5,563,395 A | 10/1996 | Hoshino |
| 5,602,742 A | 2/1997 | Solondz et al. |
| 5,606,507 A | 2/1997 | Kara |
| 5,631,827 A | 5/1997 | Nicholls et al. |
| 5,656,799 A | 8/1997 | Ramsden et al. |
| 5,682,318 A | 10/1997 | Kara |
| 5,699,258 A | 12/1997 | Thiel |
| 5,710,706 A | 1/1998 | Markl et al. |
| 5,729,459 A | 3/1998 | Brandien et al. |
| 5,774,886 A | 6/1998 | Kara |
| 5,778,076 A | 7/1998 | Kara et al. |
| 5,796,834 A | 8/1998 | Whitney et al. |
| 5,822,739 A | 10/1998 | Kara |
| 5,831,220 A | 11/1998 | Ramsden et al. |
| 5,841,076 A | 11/1998 | Schwartz et al. |
| 6,035,291 A | 3/2000 | Thiel |
| 6,041,318 A | 3/2000 | Danford-Klein et al. |
| 6,047,271 A | 4/2000 | Danford-Klein et al. |
| 6,470,327 B1 * | 10/2002 | Carroll ............... G01G 19/005 705/401 |
| 6,697,824 B1 | 2/2004 | Bowman-Amuah |
| 7,975,019 B1 * | 7/2011 | Green ............... G06Q 30/0631 709/217 |
| 2002/0023057 A1 | 2/2002 | Goodwin et al. |
| 2002/0032573 A1 | 3/2002 | Williams et al. |
| 2002/0032612 A1 | 3/2002 | Williams et al. |
| 2002/0120505 A1 * | 8/2002 | Henkin ............... G06Q 30/02 705/14.69 |
| 2002/0169710 A1 | 11/2002 | Morimoto |
| 2002/0186255 A1 | 12/2002 | Shafron et al. |
| 2003/0187668 A1 | 10/2003 | Ullmann et al. |
| 2004/0254808 A1 | 12/2004 | Bennett et al. |
| 2006/0173700 A1 * | 8/2006 | Fenelon ............... G06Q 10/0833 705/333 |
| 2006/0282271 A1 | 12/2006 | Anada et al. |

OTHER PUBLICATIONS

FedEx Ship Manager User Guide, Version 2180, 2003, available at http://www.fedex.com/US/software/FSM_User_Guide_Ver_2180.pdf (Year: 2003).*

* cited by examiner

SHIPPING INTERFACE FOR A USER INTERFACE

CROSS-REFERENCE TO RELATED APPLICATIONS

The present application is a continuation of U.S. patent application Ser. No. 11/586,843 entitled "SHIPPING INTERFACE FOR A USER INTERFACE," filed Oct. 26, 2006, which is related to commonly assigned U.S. patent application Ser. No. 11/353,690 entitled "SYSTEM AND METHOD FOR VALIDATING POSTAGE," filed Feb. 14, 2006 and issued as U.S. Pat. No. 7,711,650 on May 4, 2010; U.S. patent application Ser. No. 10/991,241 entitled "SYSTEM AND METHOD FOR GENERATING PERSONALIZED POSTAGE INDICIA," filed Nov. 17, 2004, abandoned; and U.S. patent application Ser. No. 11/323,455 entitled "HYBRID POSTAGE PRINTER SYSTEMS AND METHODS," filed Dec. 30, 2005, abandoned, the disclosures of which are hereby incorporated herein by reference in their entirety.

TECHNICAL FIELD

The invention relates generally to the generation of shipping documents and, more particularly, to providing a shipping interface for user interfaces.

BACKGROUND OF THE INVENTION

The population, whether private individuals, businesses, governmental entities, charitable organizations, etcetera, has many mailing and shipping (collectively referred to as shipping) needs. For example, persons may have a need to post documents, books, parcels, etcetera via a postal service (e.g., the United States Postal Service (USPS)), an express courier service (e.g., Federal Express, DHL, or Purolator Courier), a parcel service (e.g., United Parcel Service (UPS)), and/or the like (collectively referred to as shipping services). Various considerations, such as pickup and delivery times, cost, size and weight restrictions, parcel content restrictions, etcetera may influence or even dictate a person's selection of a particular shipping service.

Many solutions have been developed to facilitate a person's ability to use a shipping service. Recently, with the advent of computers, and their becoming nearly ubiquitous in many societies, sophisticated automated solutions have been developed to assist persons in various aspects of a shipping task, including determining a proper cost for shipping, generating a shipping label, generating a shipping manifest, generating a postage indicia or other proof of payment for services, logging a shipment, tracking a shipment, etcetera. For example, on-line generation of postage indicia and associated services, including shipping label generation, account management, and tracking, are provided by systems of Stamps.com, Inc., the assignee of the present application. On-line generation of a shipping label, including information for billing the shipping services, and tracking are provided by systems of FedEx Express, Inc. Similarly, on-line generation of a shipping label, including information for billing the shipping services, and tracking are provided by systems of United Parcel Service of America, Inc. These have provided excellent stand-alone shipping solutions, but typically have not addressed multiple shipping provider comparison and selection and have generally lacked integration with other applications.

There are a large number of persons wherein Internet or World Wide Web interaction is the source of transactions requiring shipping. For example, an electronic mail ("e-mail") message received through a web service such as Hotmail™ or Yahoo!™ Mail may precipitate shipping a document or parcel. Similarly, an electronic commerce ("e-commerce") transaction, such as may be made through an Internet store or auction site, may precipitate shipping a parcel.

Although most web sites provide no interface to shipping applications, several web sites have begun to vertically integrate services and thus have provided an interface to one or more shipping applications. For example, the popular Internet auction site eBay™ includes buttons on certain web pages to allow a user to select and initiate a shipping application for generating shipping labels, generating postage indicia, etcetera. For example, a user is allowed to select between the USPS and UPS for shipping an item after the conclusion of an eBay™ auction. These two shipping applications, however, are separate and do not provide any form of shipping provider comparison. Moreover, the shipping accounts used with respect to these shipping applications are unique, such that even if the user already has a shipping account with either or both of these shipping providers that account is not accessed. Where the user has shipping accounts with other such Internet sites, the number of accounts becomes extremely difficult to manage.

A user with a shipping account for eBay™ and an online postage account with an Internet postage provider, for example, can not use the same postage account on the back end for all their shipping labels unless the user foregoes the shipping interface provided by eBay™ and instead separately uses the Internet postage provider's application directly. However, to use such a separate application, the user will be required to input any desired data, such as name, address, etcetera, otherwise available from eBay™, or at least electronically cut and paste such data from the eBay™ site into an appropriate field in the separate application. Similarly, if a user receives shipping information via e-mail, with current shipping applications the user will be required to input or copy and paste the information from the e-mail client into the shipping application.

Accordingly, there is a need for a wider variety of shipping solutions, and in particular shipping solutions which are not custom to every Internet site. A further need exists for shipping solutions which allow a user to select a shipping provider of choice, regardless of a particular Internet site precipitating the shipping event. A still further need exists for a user to be enabled to readily use a same shipping account with respect to shipping events precipitated from different Internet sites. A further need exists for information with respect to the context of a shipment, such as an item shipped, to be automatically obtained and/or saved in association with shipping account information or other shipping application information.

BRIEF SUMMARY OF THE INVENTION

The present invention is directed to systems and methods which provide a shipping interface within a user interface. According to embodiments of the invention, a shipping interface is provided within a open architecture or multiple application user interface, such as a browser user interface commonly used with respect to the Internet, intranets, extranets, and operating systems. A shipping interface of embodiments of the invention may be utilized to provide shipping functionality, such as determining proper costs for shipping, providing comparisons of various shipping providers, generating shipping labels, generating shipping manifests, generating postage indicia or other proof of payment for services, logging shipments, tracking shipments, etcetera, with respect to any number of applications or functions, such as those associated with various Internet sites, e-mail clients, operating systems, etcetera.

In operation according to embodiments of the invention, a user is enabled to use a same shipping account with respect to any number of applications or functions. For example, a user is enabled to use a same USPS postal account with respect to shipments associated with different vendors (e.g., eBay™, Amazon.com™, Yahoo!™) using a browser based shipping interface of an embodiment of the present invention. Moreover, embodiments of the invention allow a user to select a shipping provider of preference (e.g., USPS, UPS, Federal Express, Purolator Courier, DHL, etcetera) even where the underlying web application or function does not support the selected shipping provider, whether directly or indirectly. The user may not only be enabled to select a preferred shipping provider, but embodiments of the invention further provide comparison of various shipping providers (e.g., rates, pickup schedules, delivery schedules, services offered, etcetera) to a user for a more informed selection.

Embodiments of the invention comprise one or more browser plug-in operable to provide a shipping interface. For example, plug-in code for providing a shipping interface may be written in any suitable programming language (e.g., C++) capable of providing hooks and links into a desired standard browser user interface, such as Internet Explorer™ or Netscape™. Alternatively, plug-in code for providing a shipping interface may be written in a browser extension environment (e.g., Firefox™, Greasemonkey™, etcetera). Embodiments of the invention utilize browser plug-ins which are themselves applications, such as Java applications or as may be provided through use of ActiveX controls.

Browser plug-ins of embodiments of the invention provide integration between the browser user interface, and perhaps applications or functions operable therein, and one or more shipping application, such as to extract relevant shipping information or other information from a page displayed by the browser and populate the appropriate fields within a shipping application for shipping functions. For example, a same browser plug-in may provide integration between the browser user interface and a plurality of shipping applications, such as may be associated with different shipping providers. Additionally or alternatively, a plurality of browser plug-ins may be utilized to provide integration between the browser user interface and a plurality shipping applications, such as where a particular browser plug-in is associated with a particular shipping provider's shipping application. Similarly, a same browser plug-in may provide integration with respect to a plurality of applications (e.g., web applications) operable within the browser user interface or a plurality of browser plug-ins may be utilized to provide integration with respect to a plurality of applications, such as where a particular browser plug-in is associated with a particular application. Embodiments of the invention may directly provide shipping functionality by the browser plug-in, rather than integration with a separate shipping application, if desired.

The foregoing integration may be bidirectional, such as to input information with respect to a shipping function having been initiated or completed to the browser or an application or function operable therein. Moreover, the integration may provide features in addition to shipping functions. For example, information with respect to the context of the shipment, such as the item shipped, a transaction underlying the shipment, etcetera, may be obtained and/or stored by embodiments of the invention. According to embodiments of the invention, such shipping context information is provided to a shipping application for storage in association with shipping account and/or shipping record information.

A browser plug-in of embodiments of the invention operates to insert one or more shipping buttons within a page displayed by the browser, such as near address information or other information which may be associated with a shipping event. For example, the code of the browser plug-in may operate to parse information accessible to and/or displayed by the browser to identify information which may be associated with or otherwise precipitate a shipping event and thus cause one or more shipping interface buttons to be displayed within the main browser window. Selection of such a shipping interface button may access shipping features, such as rate calculation, provider comparison, shipping label generation, postage indicia generation, output of data to an application or web page, etcetera, such as through popup windows, dropdown menus, and/or the like.

One or more shipping buttons and/or shipping information may be provided by a browser plug-in of embodiments of the invention outside of the main browser window, such as within a popup window, within a frame along the side, top, or bottom of the main browser window, etcetera. For example, the code of the browser plug-in may operate to parse information accessible to and/or displayed by the browser to identify information which may be associated with or otherwise precipitate a shipping event and thus cause a shipping interface frame to be displayed, such as may comprise one or more shipping interface buttons, shipping information, etcetera. A user may interact with the shipping interface frame to access various shipping features.

Additionally or alternatively, one or more shipping buttons may be provided by a browser plug-in of embodiments of the invention outside of main browser window by displaying such shipping buttons on a browser menu bar, tool tray, or other unobtrusive area. For example, the code of the browser plug-in may operate to parse information accessible to and/or displayed by the browser to identify information which may be associated with or otherwise precipitate a shipping event and thus cause one or more shipping interface buttons to be displayed on a browser menu bar. A user may interact with the shipping interface button to access various shipping features. Such browser interface buttons may be present even when information associated with or precipitating a shipping event is not present, although the button may be inoperative (e.g., "grayed out"), operative to provide information, operative to provide manual shipping functions, operative to provide operation information, etcetera.

It should be appreciated from the foregoing that embodiments of the invention facilitate shipping functionality in association with any of a number of network sites, applications, and functions, including automated extraction and/or insertion of relevant data between such sites, applications, and functions and shipping applications. Shipping functionality provided according to embodiments of the invention may be provided even where shipping functionality is otherwise already provided (e.g., providing a shipping interface button in addition to a "ship it" button or other mailing service feature native to an Internet site being visited), such as to provide shipping provider choice, facilitate use of a same account with different applications or sites, provide integrated shipping reports with respect to different shipping providers, different underlying applications, etcetera. Using a shipping interface of embodiments of the invention, a user is enabled to use a same shipping account (e.g., USPS postage account) with respect to all shipping events across multiple vendors' platforms.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
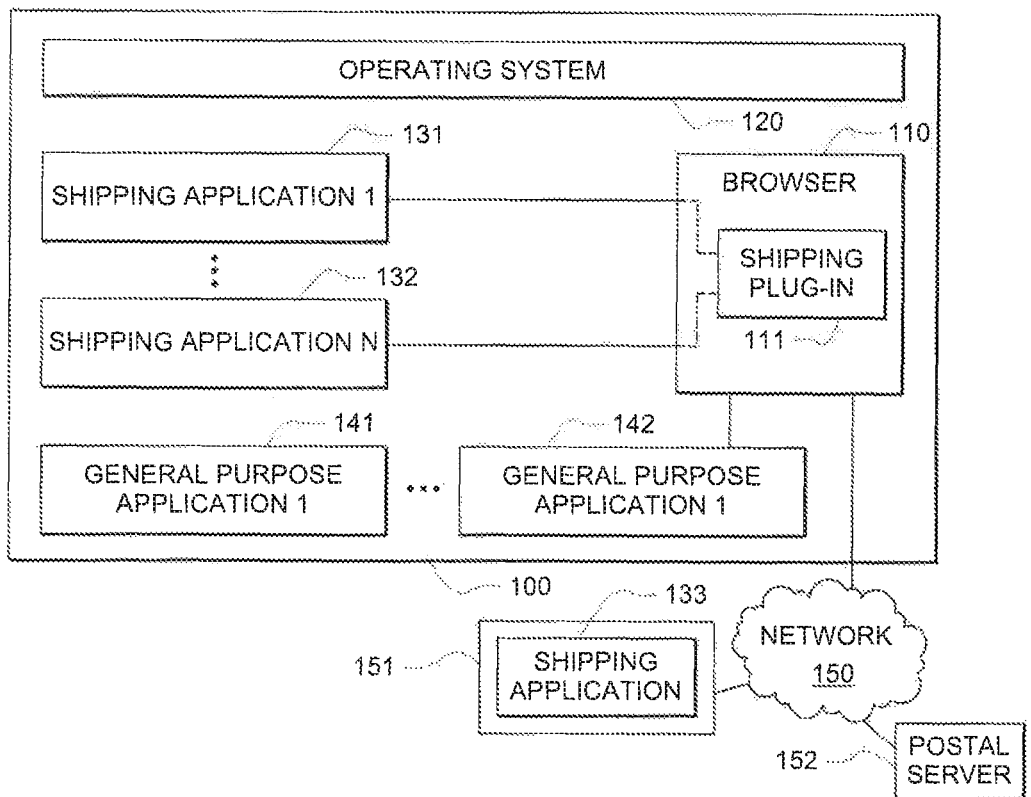
FIG. 1 shows a high level functional block diagram of a system adapted to provide a shipping user interface according to embodiments of the invention.

Directing attention to FIG. 1, a high level functional block diagram of a system adapted to provide a shipping interface within a user interface according to an embodiment of the present invention is shown. Specifically, host 100 of FIG. 1 comprises operating system 120, such as may comprise Microsoft Windows™, Linux, Apple Mac OS™, Unix™, etcetera, controlling operation of one or more applications, such as shipping applications 131-132 and general purpose applications 141-142, on host 100. Host 100 of the illustrated embodiment is coupled to network 150, such as may comprise a telephone network (e.g., the public switched telephone network (PSTN)), a local area network (LAN), a metropolitan area network (MAN), a wide-area network (WAN), an intranet, an extranet, the Internet, and/or the like, to interact with systems, applications, and data disposed on the network.

Shipping applications 131-133 may comprise any number of applications adapted to facilitate shipping functionality, such as those shown and described in the above reference patent applications entitled "System and Method for Validating Postage," "System and Method for Generating Personalized Postage Indicia," and "Hybrid Postage Printer Systems and Methods." It should be appreciated that, one or more of shipping applications 131-133 may interact with various systems, applications, functions, databases, etcetera in providing shipping functions. For example, a shipping application may interact with postal server 152, disposed n network 150 in the illustrated embodiment, to request postage indicia, to debit a cost for shipping, to verify address information, to obtain postage value, etcetera.

Shipping applications utilized according to embodiments of the invention may be provided in various configurations. For example, shipping applications 131-132 of the illustrated embodiment are hosted within host 100. In contrast, shipping application 133 of the illustrated embodiment is hosted by sever 151 disposed on network 150. Of course, embodiments of the invention may provide shipping interfaces with respect to shipping applications having configurations different than illustrated in FIG. 1, whether in addition to or in the alternative to shipping applications 131-133. For example, a shipping application for which a shipping interface is provided according to embodiments of the invention may be operable within browser 110, such as in the form or an applet executable within the browser environment. Such a shipping application may comprise an application operable through or within the browser environment, such as may comprise a Java application or as may be provided through use of ActiveX controls.

General purpose applications 141-142 may comprise any number of applications providing desired functionality. For example, applications 141-142 may comprise a word processor application, an accounting application, a database application, a communications application, a spreadsheet application, a graphics application, and/or the like.

According to preferred embodiments of the invention, browser 110 comprises an open architecture user interface (e.g., Internet Explorer™ or Netscape™) providing a user interface which may be utilized with a plurality of applications, functions, etcetera. For example, browser 110 may be utilized to provide a user interface with respect to operating system 120, general purpose application 142, and/or applications provided by systems of network 150. Shipping plug-in 111, provided with respect to browser 110, facilitates interaction between shipping applications 131-133 and browser 110 and applications operable with respect thereto. Browser 110 of the illustrated embodiment is operable upon host 100, such as may comprise a general purpose processor-based system such as a personal computer or other general purpose computer system.

It should be appreciated that, although a single shipping plug-in 111 is illustrated in FIG. 1, embodiments of the invention may provide a plurality of shipping plug-ins. For example, a plurality of shipping plug-ins associated with different shipping providers may be provided, a plurality of shipping plug-ins associated with different shipping services may be provided, or a plurality of shipping plug-ins associated with different underlying applications (e.g., different web sites for which shipping services are to be provided), wherein each such shipping plug-in is specifically configured for an associated shipping provider, shipping service, underlying application, etcetera. Such a plurality of shipping plug-ins may be installed to a single browser in order to facilitate a user selecting between different shipping providers, different shipping services, different underlying applications, etcetera. Alternatively, a user may select one of the available shipping plug-ins for installation to a browser to facilitate shipping using a selected service provider, shipping service, underlying application, etcetera. Of course, embodiments of the invention may utilize a single shipping plug-in to facilitate shipping using a plurality of shipping providers, a plurality of shipping services, underlying applications, etcetera.

Figure 2:
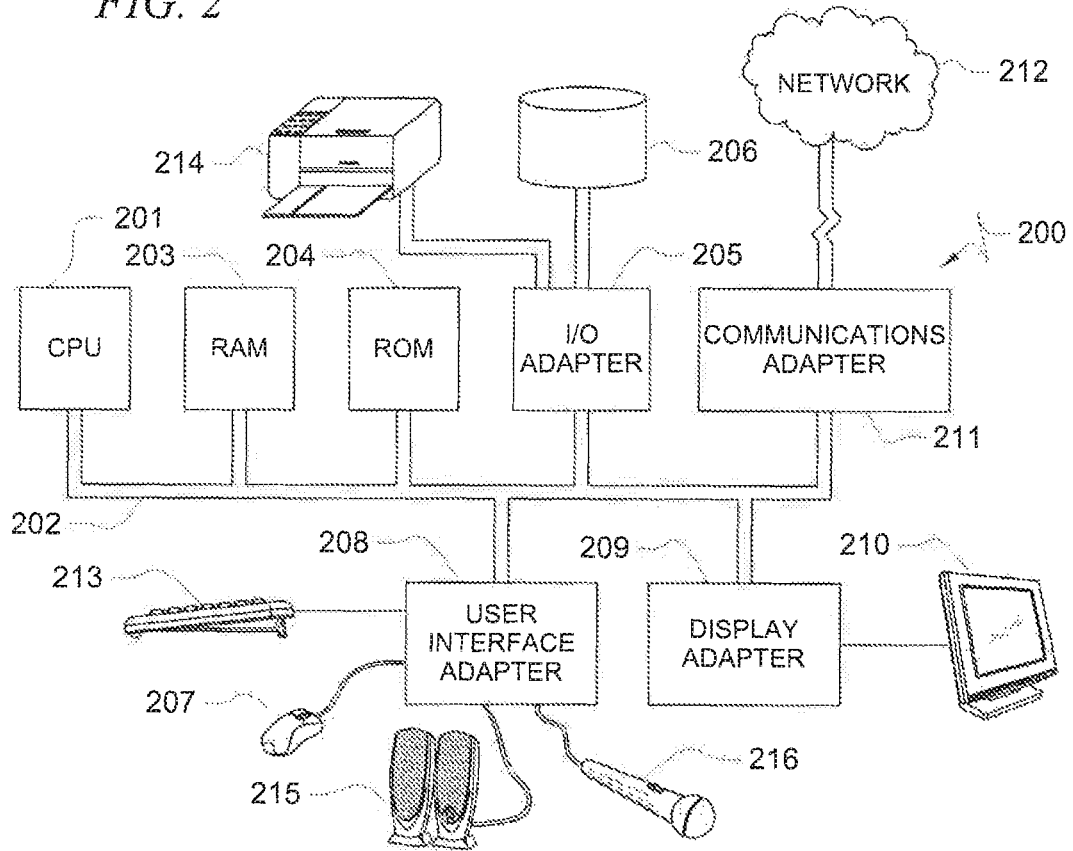
FIG. 2 shows a computer system as may be utilized in providing the shipping user interface of FIG. 1.

Directing attention to FIG. 2, computer system 200 as may be utilized as host 100 of FIG. 1 is shown. Central processing unit (CPU) 201 is coupled to system bus 202. The CPU 201 may be any general purpose CPU, such as an Intel Pentium™, Motorola Power PC™, or other processor (it being appreciated that the present invention is not restricted by the architecture of CPU 201 as long as CPU 201 supports the inventive operations as described herein). Bus 202 is coupled to random access memory (RAM) 203, which may comprise SRAM, DRAM, SDRAM, flash memory, and/or the like. ROM 204 is also coupled to bus 202, which may comprise PROM, EPROM, EEPROM, and/or the like. RAM 203 and ROM 204 hold user and system data and programs, such as browser 110, shipping plug-in 111, operating system 120, shipping applications 131-132, and general purpose applications 141-142, as is well known in the art.

Bus 202 is also coupled to input/output (I/O) controller 205, communications adapter 211, user interface adapter 208, and display adapter 209. I/O adapter 205 connects to storage devices 206, such as may comprise one or more of a hard drive, a CD drive, a floppy disk drive, a tape drive, to the computer system. I/O adapter 205 is also connected to printer 214, which facilitates printing information such as documents, photographs, articles, meter stamps, etcetera, wherein printer 214 may comprise a typical printer (e.g. dot matrix, laser, etcetera), a fax machine, a copy machine, a special purpose postage printer, and/or the like. I/O adapter 205 may be coupled to additional or alternative peripherals useful according to embodiments of the invention, such as a postal scale, a secure postage value storage unit etcetera. Communications adapter 211 is adapted to couple computer system 200 to network 212, such as may correspond to network 150 of FIG. 1, which may comprise the PSTN, a LAN, a MAN, a WAN, an intranet, an extranet, the Internet, and/or the like. User interface adapter 208 couples user input devices, such as keyboard 213, pointing device 207, and microphone 216, to the computer system 200. User interface adapter 208 also provides output to a user, such as sound via speaker(s) 215. Display adapter 209 is driven by CPU 201 to control the display on display device 210.

When implemented in software, elements of the present invention may comprise code segments, operable upon a host such as computer system 200, to define operation as described herein. The program or code segments can be stored in a processor readable medium, such as an electronic circuit, a semiconductor memory device, a ROM, a flash memory, an erasable ROM (EROM), a floppy diskette, a compact disk CD-ROM, an optical disk, a hard disk, etcetera.

Shipping plug-in 111 of embodiments of the invention comprises browser plug-in code adapted to interface with appropriate aspects of browser 110 to provide a shipping interface with respect thereto. Plug-in code of shipping plug-in 111 may be written in a programming language, such as C++, or a browser extension environment, such as Firefox™ or Greasemonkey™, for otherwise standard browser user interfaces, such as Internet Explorer™ or Netscape™. Shipping plug-in 111 may itself comprise an application, such as a Java application or as may be interfaced with browser 110 through ActiveX controls or the like. Shipping plug-in 111 of embodiments provides integration between browser 110, applications or functions operable with respect to browser 110 (e.g., operating system 120, applications 141-142, and/or applications of network 150), and one or more of shipping applications 131-133. Additionally or alternatively, embodiments of shipping plug-in 111 may itself provide various functions, such as to itself provide shipping application functionality.

In operation according to preferred embodiments, shipping plug-in 111 may operate with browser 110 to cooperate with appropriate ones of operating system 120, shipping applications 131-133, general purpose applications 141-142, and/or network 150 to provide desired shipping functionality in association with any number of applications or functions, such as those associated with various Internet sites, e-mail clients, operating systems, etcetera. Such shipping functionality may include determining proper costs for shipping, providing comparisons of various shipping providers, generating shipping labels, generating shipping manifests, obtaining or generating postage indicia or other proof of payment for services, logging shipments, tracking shipments, and/or the like. Accordingly, shipping plug-in 111 may operate to extract relevant shipping information or other information from a page displayed by browser 110 and populate the appropriate fields within an appropriate one of shipping applications 131-133 for shipping functions. Additionally information with respect to the context of the shipment, such as the item shipped, a transaction underlying the shipment, etcetera, may be extracted by shipping plug-in 111 for providing to an appropriate one of shipping applications 131-133, such as for storage in association with shipping account and/or shipping record information.

Integration provided by shipping plug-in 111 of embodiments with respect to applications or functions operable with respect to browser 110 may be bidirectional. For example, shipping plug-in 111 may operate to provide information to an appropriate one of operating system 120, general purpose applications 141-142, and/or network 150. As but one example, shipping plug-in 111 may provide input of information to an application for which a shipping service was provided to indicate to that application that the shipping function has been initiated or completed.

Shipping plug-in 111 of embodiments may operate to provide a shipping interface with respect to browser 110 in various ways. For example, shipping plug-in 111 may operate to parse web pages displayed by browser 110, whether automatically or in response to user control, to identify information which may precipitate a shipping event, to obtain shipping information, to input shipping information, etcetera. In parsing a web page, embodiments of the invention may operate to recognize data presented in a typical address format, to identify information appearing to be a zip code and analyze nearby information to identify an address, to identify a transaction likely to be associated with a shipment, to identify shipping instructions or features appearing in a web page, etcetera. Additionally or alternatively, shipping plug-in 111 may operate to alter web pages displayed by browser 110 to provide aspects of a shipping functionality user interface therein. Accordingly, shipping plug-in 111 of embodiments of the invention operates to insert one or more shipping buttons within a page displayed by browser 110. Additionally or alternatively, one or more shipping buttons and/or shipping information may be provided by shipping plug-in 111 of embodiments of the invention outside of the main browser window, such as within a frame along the side, top, or bottom of the main browser window.

Figure 3:
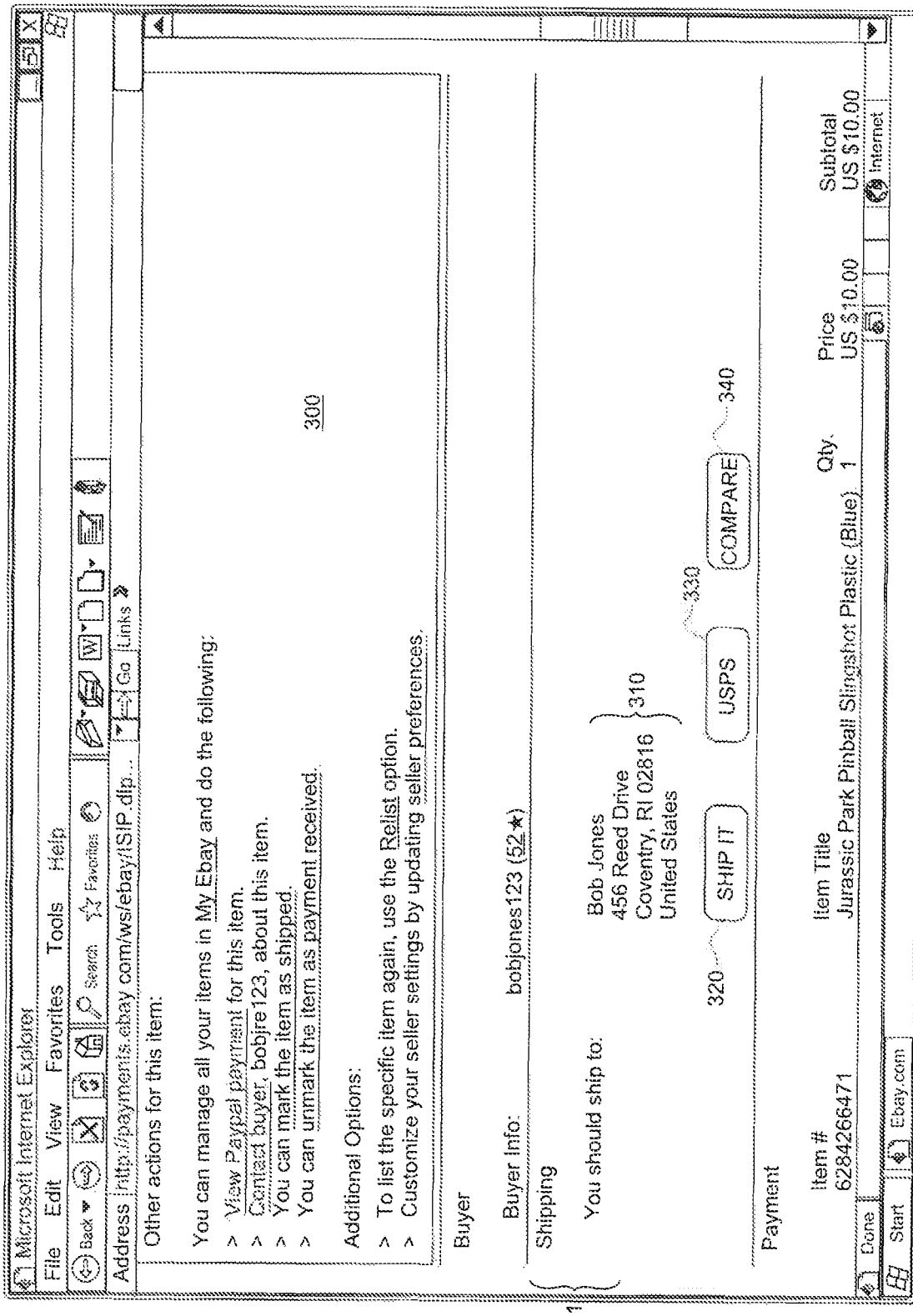
FIG. 3 shows an embodiment of the present invention wherein a page presented by a browser user interface is modified to present a portion of a shipping user interface of the present invention.

Directing attention to FIG. 3, a browser screen comprising a portion of an Internet auction site web page as may be displayed by browser 110 is shown. Web page 300 of the illustrated embodiment includes information 310 which is indicative of a shipping event possibly being associated with the information on web page 300. In the illustrated embodiment, information 310 comprises shipping information in a recognizable form, facilitating shipping plug-in 111 parsing information of web page 300 to identify information 310, and thus recognize the possibility of a shipping event. Of course, information in addition to or in the alternative to such shipping information may be used to identify the possibility of a shipping event. For example, information 311 stating "shipping," may be utilized by shipping plug-in 111 to recognize the possibility of a shipping event. Similarly, the inclusion of native shipping button 320 may be utilized by shipping plug-in 111 to recognize the possibility of a shipping event being associated with web page 300.

It should be appreciated that shipping plug-in 111 of embodiments may include algorithms to recognize possible shipping events and/or shipping information in association with a page displayed by browser 110 through analyzing the data to identify particular types of information, such as shipping information. Additionally or alternatively, shipping plug-in 111 of embodiments may include algorithms to recognize possible shipping events and/or shipping information in association with a page displayed by browser 110 through a knowledge base of various web pages, web page structures, etcetera. For example, shipping plug-in 111 may utilize a knowledge base to recognize information associated with a shipping provider (e.g., link to a shipping provider, button for selecting a shipping provider's services, etcetera), and thus conclude that possible shipping events and/or shipping information is associated with a page displayed by browser 110. Additionally or alternatively, shipping plug-in 111 may identify a particular source of a page, such as by a uniform resource locater (URL), and access a knowledge base having information with respect to where/how shipping information is presented by that source. According to embodiments of the invention, scripts may be provide with respect to various web pages and/or applications known to precipitate shipping events tailored to recognize shipping data therein. Such scripts may be updated, supplemented, added, etcetera from time to time, as desired.

Web pages or other information displayed by browser 110 may include more than one set of information indicative of a shipping event. For example, a plurality of addresses may appear in web page 300. Shipping plug-in 111 of embodiments of the invention may operate to identify each such occurrence of information possibly associated with a shipping event, whether to provide shipping features with respect to each occurrence of such information or to provide further processing to determine a subset of the information sets to provide shipping features with respect to (e.g., based upon context within the web page, based upon location within the web page, etcetera).

Irrespective of how shipping plug-in 111 recognized the possibility of a shipping event being associated with web page 300, shipping plug-in 111 of the illustrated embodiment operated to alter web page 300 as served up by a source thereof in order to provide a shipping user interface according to an embodiment of the present invention. In particular, shipping plug-in 111 caused shipping function buttons 330 and 340 to be presented in a main window portion of web page 300. Shipping function buttons 330 and 340 of the illustrated embodiment provide shipping functions in addition to the shipping functions native to web page 300 (i.e., native shipping button 320 providing a "ship it" control) or add shipping functions to a web page where no shipping functions are native thereto. In addition to or in the alternative to shipping function buttons, embodiments of shipping plug-in 111 may provide shipping information or other alterations within the main window of web page 300 useful in providing shipping features according to embodiments of the present invention.

In the illustrated embodiment, shipping function buttons 330 and 340 are presented near information in web page 300 recognized as possibly associated with a shipping event (e.g., information 310 and/or native shipping button 320) to provide a convenient, intuitive, and/or esthetically pleasing shipping interface. Of course, shipping function buttons and/or other shipping user interface components may be disposed elsewhere within web page 300, if desired. Where multiple sets of information possibly associated with a shipping event are present in web page 300, shipping plug-in 111 may operate to dispose shipping function buttons near each occurrence of information in web page 300 recognized as possibly associated with a shipping event. Alternatively, shipping plug-in 111 may operate to provide one or more sets of shipping function buttons which are associated with a plurality of sets of information recognized as possibly associated with a shipping event.

Shipping function buttons 330 and 340 may be selected by a user to access various shipping features not otherwise available with respect to web page 300. For example, shipping function button 340 may provide access to comparison information with respect to various shipping service providers, such as rates, pickup schedules, delivery schedules, services offered, etcetera through interaction with shipping applications 131-133 and/or a shipping comparison application (e.g., as may be disposed on network 150), to facilitate a user making a more informed selection of a shipping service provider. Shipping function button 330 may provide access to shipping features, such as rate calculation, provider comparison, shipping label generation, postage indicia generation, output of data to an application or web page, etcetera through interaction with one or more of shipping applications 131-133, to facilitate a user utilizing a shipping service provider not otherwise available through native shipping button 320 and/or utilizing a same shipping account with respect to shipping events precipitated from different sources.

It should be appreciated that selection of shipping function buttons 330 and 340 may operate to provide additional options and/or information to a user, such as through dialog boxes, popup windows, dropdown menus, addition of one or more frames to web page 300, and/or the like. For example, selection of shipping function button 340 may cause a dialog box to open which shows various shipping service providers, such as those corresponding to shipping applications 131-133, and their associated information for comparison. This dialog box may provide additional shipping function buttons, such as to allow a user to obtain further information, to select particular shipping features, to input shipping information not present or otherwise not obtained from web page 300, to select a desired shipping service provider and access a corresponding one of shipping applications 131-133 for further shipping service processing, and/or the like.

Selection of shipping function button 330 may cause a dialog box to open which allows editing of shipping information obtained from web page 300, input of shipping information not present or otherwise obtained from web page 300, access to a corresponding one of shipping applications 131-133 for further shipping service processing, and/or the like.

In operation according to a preferred embodiment, a user utilizing shipping function buttons 330 and/or 340 is enabled to ultimately navigate to a point to generate shipping documentation, such as postage indicia, packing slip, a shipping label, a shipping manifest, a shipment log, etcetera through operation of an appropriate one of shipping applications 131-133. Such operation may include debiting an account for the cost of the shipping services, such as to deduct an amount of postage from a secure postage value user account, such as may be stored in a secure postage value storage unit (e.g., a cryptographic memory unit, electronic postage metering system, etcetera).

Figure 4:
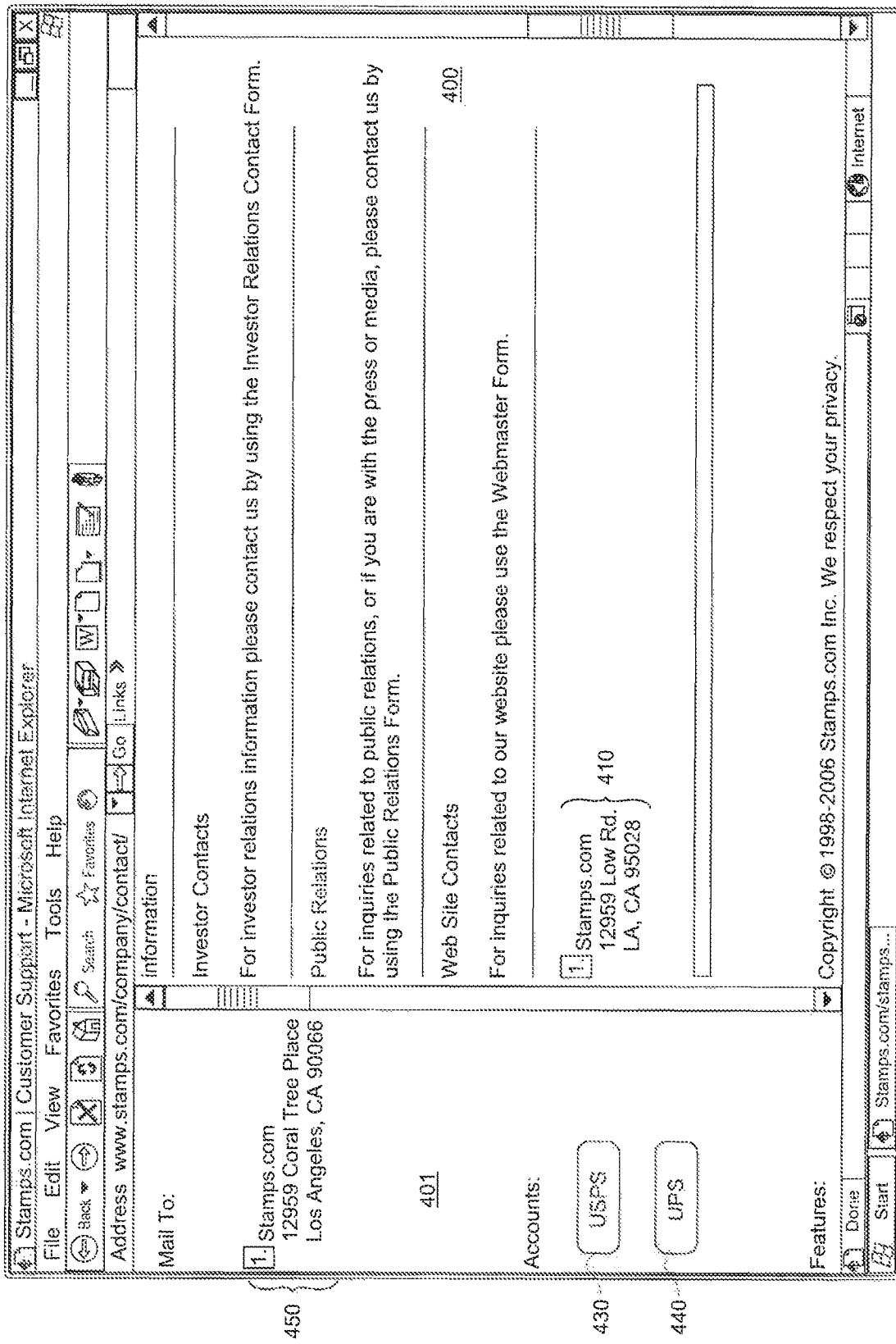
FIGS. 4 and 5 show an embodiment of the present invention wherein frames presenting a portion of a shipping user interface of the present invention are displayed in association with a page presented by a browser user interface.
Figure 5:
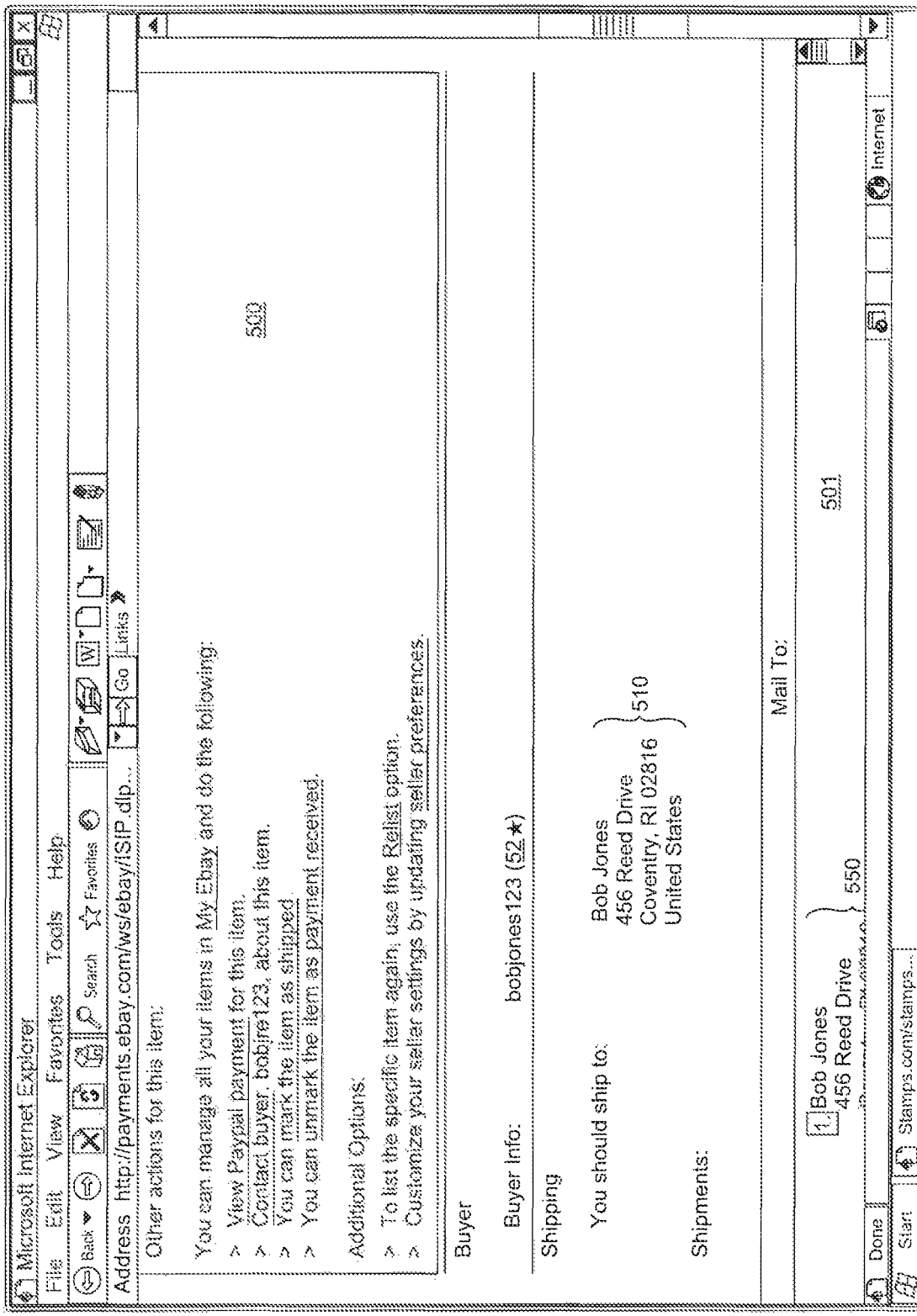

Directing attention to FIGS. 4 and 5, a browser screen wherein shipping plug-in 111 has operated to provide shipping function buttons and/or other information outside of the main browser window. Specifically, FIG. 4, wherein web page 400 comprises a company information page in the illustrated embodiment, shows a shipping frame added along the side of web page 400 to provide shipping function buttons and/or other information in association with web page 400. FIG. 5, wherein web page 500 comprises an Internet auction site page in the illustrated embodiment, shows a shipping frame added along the bottom of web page 500 to provide shipping function buttons and/or other information in association with web page 500.

Referring now to FIG. 4, web page 400 of the illustrated embodiment includes information 410 which is indicative of a shipping event possibly being associated with the information on web page 400. In the illustrated embodiment, information 410 comprises shipping information in a recognizable form, facilitating shipping plug-in 111 parsing information of web page 400 to identify information 410, and thus recognize the possibility of a shipping event. However, as discussed with respect to the embodiment of FIG. 3 above, information in addition to or in the alternative to such shipping information may be used to identify the possibility of a shipping event.

As web pages or other information displayed by browser 110 may include more than one set of information indicative of a shipping event, shipping plug-in 111 of embodiments of the invention operates to identify each such occurrence of information possibly associated with a shipping event. In the embodiment illustrated in FIG. 4, because a single set of shipping function buttons and/or other information is provided by shipping plug-in 111 for all information indicative of a shipping event within web page 400, shipping information 450 is provided with an identifier (shown here as the numeral "1") for distinguishing this set of shipping information from other sets of shipping information (not shown) which may be associated with web page 400. Although the illustrated embodiment of shipping plug-in 11/ provides shipping information and/or shipping function buttons outside of a main window of web page 400, shipping plug-in 111 of embodiments may additionally operate to alter web page 400 as served up by a source thereof in order to provide a shipping user interface according to an embodiment of the present invention. In particular, shipping plug-in 111 of the illustrated embodiment caused an identifier (shown here as the numeral "1") to be disposed next to information 410. Such information may be desirable for use in identifying the source of shipping information or otherwise for facilitating shipping features of embodiments of the invention.

Irrespective of how shipping plug-in 111 recognized the possibility of a shipping event being associated with web page 400 and the number of sets of information identified, shipping plug-in 111 of the illustrated embodiment operated to present a shipping user interface in association with web page 400 according to an embodiment of the present invention. In particular, shipping plug-in 111 caused frame 401, including shipping function buttons 430 and 440, shipping information 450, and perhaps additional shipping function buttons, information, and/or features, to be presented along side a main window portion of web page 400. Shipping information 450 of the illustrated embodiment displays information identified within web page 400 which may precipitate a shipping event. According to embodiments, this shipping information may be edited (e.g., to add a title, such as Mr., Ms., etcetera, to correct information, to add information, etcetera). Shipping function buttons 430 and 440 of the illustrated embodiment provide shipping functions in addition to shipping functions native to web page 400 or add shipping functions to web page 400 where no shipping functions are native thereto. Various shipping features, such as review shipping account, track shipments, input/edit shipping information, etcetera, may additionally or alternatively be provided by shipping plug-in 111 in frame 401.

As with shipping function buttons 330 and 340 discussed above with respect to the embodiment of FIG. 3, shipping function buttons 430 and 440 may be selected by a user to access various shipping features not otherwise available with respect to web page 400. For example, shipping function buttons 430 and 440 may provide access to shipping features, such as rate calculation, provider comparison, shipping label generation, postage indicia generation, output of data to an application or web page, etcetera through interaction with an associated one of shipping applications 131-133, to facilitate a user utilizing a shipping service provider not otherwise available through shipping features native to web page 400 and/or utilizing a same shipping account with respect to shipping events precipitated from different sources. It should be appreciated that shipping function buttons 430 and 440 provide a user with the ability to directly select between a plurality of shipping service providers. Additionally or alternatively, one or more shipping features may be provided, such as a shipping function button, to provide access to comparison information with respect to various shipping service providers, such as rates, pickup schedules, delivery schedules, services offered, etcetera through interaction with shipping applications 131-133 and/or a shipping comparison application (e.g., as may be disposed on network 150), to facilitate a user making a more informed selection of a shipping service provider.

As with shipping function buttons 330 and 340, selection of shipping function buttons 430 and 440 may operate to provide additional options and/or information to a user, such as through dialog boxes, popup windows, dropdown menus, addition of one or more additional frames to web page 400, and/or the like. In operation according to a preferred embodiment, a user utilizing shipping function buttons 430 and/or 440 is enabled to ultimately navigate to a point to generate shipping documentation, such as postage indicia, packing slip, a shipping label, a shipping manifest, a shipment log, etcetera through operation of an appropriate one of shipping applications 131-133. Such operation may include debiting an account for the cost of the shipping services, such as to deduct an amount of postage from a secure postage value user account.

Referring now to FIG. 5, an embodiment similar to that of FIG. 4 is shown, although the shipping frame added to provide shipping function buttons and/or other information in association with web page 500 is added along the bottom of web page 500. As with web page 400 discussed above, web page 500 of the illustrated embodiment includes information 510 which is indicative of a shipping event possibly being associated with the information on web page 500. In the embodiment illustrated in FIG. 5, because a single set of shipping function buttons and/or other information is provided by shipping plug-in 111 for all information indicative of a shipping event within web page 500, shipping information 550 is provided with an identifier (shown here as the numeral "1") for distinguishing this set of shipping information from other sets of shipping information (not shown) which may be associated with web page 500. In operation, having recognized the possibility of one or more shipping events being associated with web page 500, shipping plug-in 111 of the embodiment of FIG. 5 presents a shipping user interface in association with web page 500 according to an embodiment of the present invention. In particular, shipping plug-in 111 caused frame 501, shipping information 550, and perhaps additional information, shipping function buttons, and/or features, to be presented below a main window portion of web page 500.

As with the embodiment of FIGS. 3 and 4 discussed above, a user may interact with shipping function buttons or other features presented by the shipping interface associated with frame 501 to provide additional options and/or information to a user, such as through dialog boxes, popup windows, dropdown menus, addition of one or more additional frames to web page 500, and/or the like. In operation according to a preferred embodiment, a user is enabled to ultimately navigate to a point to generate shipping documentation, such as postage indicia, packing slip, a shipping label, a shipping manifest, a shipment log, etcetera through operation of an appropriate one of shipping applications 131-133. Such operation may include debiting an account for the cost of the shipping services, such as to deduct an amount of postage from a secure postage value user account.

Figure 6:
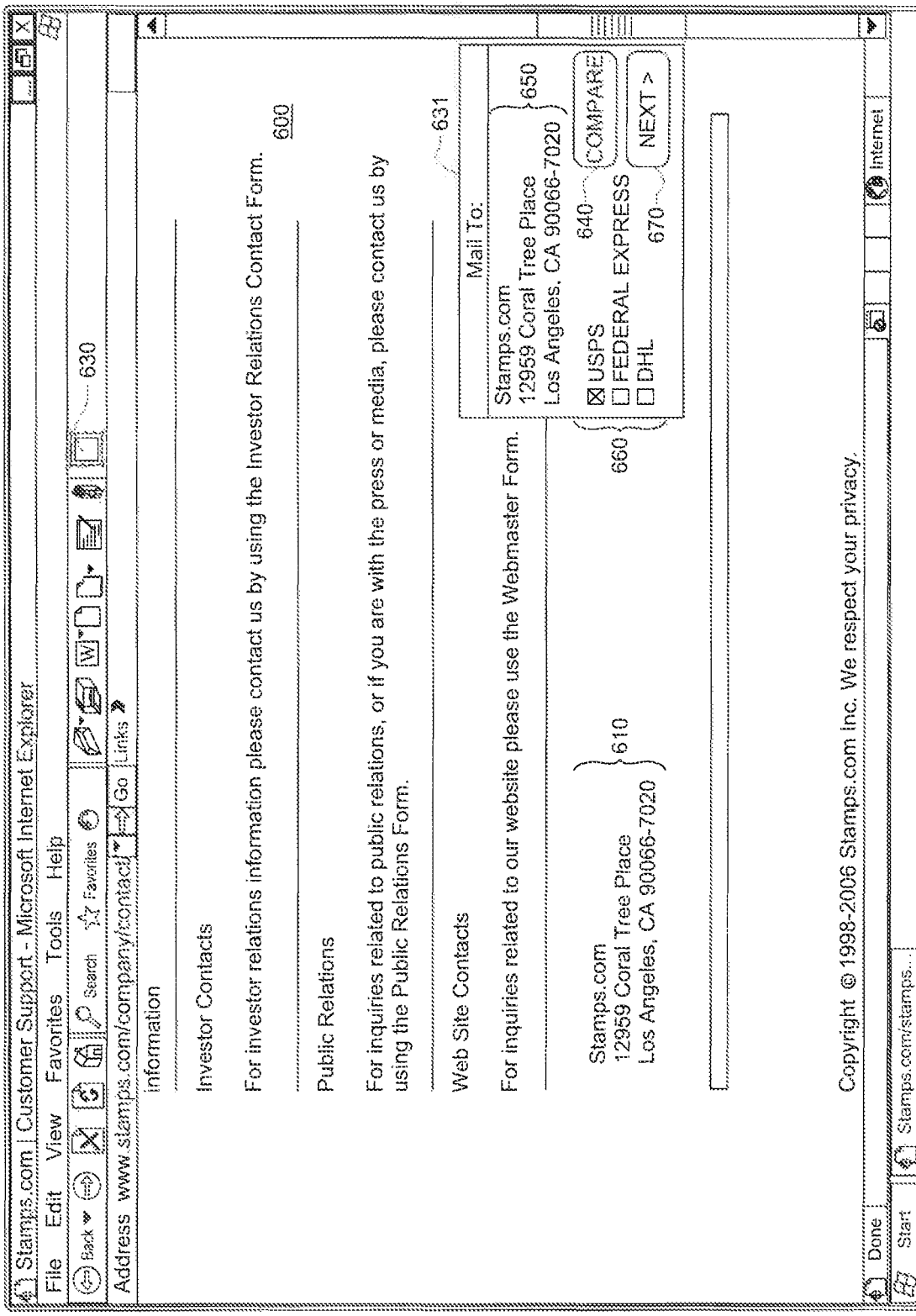
FIG. 6 shows an embodiment of the present invention wherein a portion of a shipping user interface is presented with respect to a browser user interface.

Directing attention to FIG. 6, a browser screen wherein shipping plug-in 111 has operated to provide shipping function buttons and/or other information outside of the main browser window. Specifically, FIG. 6, wherein web page 600 comprises a company information page in the illustrated embodiment, shows a shipping function button provided outside of main browser window by displaying the shipping button on a browser menu bar. Additionally or alternatively, such shipping function buttons and/or other information may be provided unobtrusively with respect to the browser user interface by displaying such shipping features in a tool tray, a frame header, etcetera.

Web page 600 of the illustrated embodiment includes information 610 which is indicative of a shipping event possibly being associated with the information on web page 600. In the illustrated embodiment, information 610 comprises shipping information in a recognizable form, facilitating shipping plug-in 111 parsing information of web page 600 to identify information 610, and thus recognize the possibility of a shipping event. However, as discussed with respect to the embodiment of FIG. 3 above, information in addition to or in the alternative to such shipping information may be used to identify the possibility of a shipping event.

Irrespective of how shipping plug-in 111 recognized the possibility of a shipping event being associated with web page 600, shipping plug-in 111 of the illustrated embodiment operated to present a shipping user interface in association with web page 600 according to an embodiment of the present invention. In particular, shipping plug-in 111 of the illustrated embodiment provides one or more shipping function button (e.g., a plurality of shipping buttons associated with different shipping providers, a plurality of shipping buttons associated with different shipping services, one shipping button associated with multiple shipping providers, etcetera), shown here as shipping function button 630, for processing shipping functions with respect to information 610. For example, shipping function button 630 may continually be present upon the browser menu bar after installation of shipping plug-in 111, although perhaps being inactive (e.g., "grayed out"). Upon shipping plug-in 111 recognizing information within web page 600 which may be associated with a shipping event, shipping plug-in 111 may cause shipping function button 630 to become active (e.g., no longer "grayed out") within the browser menu bar. Alternatively, upon shipping plug-in 111 recognizing information within web page 600 which may be associated with a shipping event, shipping plug-in 111 may cause additional features available using shipping function button 630 to become available (e.g., features for shipping items to an address of information 610), perhaps in addition to or in the alternative to features otherwise available using shipping function button 630 (e.g., review shipping account, track shipments, input/edit shipping information, etcetera).

Shipping function button 630 may be selected by a user to access various shipping features not otherwise available with respect to web page 600. For example, selection of shipping function button 630 may operate to provide additional options and/or information to a user, such as through dialog boxes, popup windows, dropdown menus, addition of one or more additional frames to web page 600, and/or the like. In the illustrated embodiment, selection of shipping function button 630 causes dialog box 631 to open, presenting additional information, shipping function buttons, and/or shipping features to a user. For example, shipping function button 640 may provide access to comparison information with respect to various shipping service providers (e.g., service providers selected at shipping feature checkboxes 660), such as rates, pickup schedules, delivery schedules, services offered, etcetera through interaction with shipping applications 131-133 and/or a shipping comparison application (e.g., as may be disposed on network 150), to facilitate a user making a more informed selection of a shipping service provider. Shipping feature checkboxes 660 may allow a user to select a plurality of service providers for comparison, select a service provider to provide shipping services, etcetera. Shipping function button 670 provides a navigation function to facilitate advancing to a next page of dialog box 631, such as to present one or more shipping function buttons, shipping information, and/or shipping features providing access to shipping features, such as rate calculation, provider comparison, shipping label generation, postage indicia generation, output of data to an application or web page, etcetera through interaction with one or more of shipping applications 131-133, to facilitate a user utilizing a shipping service provider not otherwise available through web page 600.

In operation according to a preferred embodiment, a user utilizing shipping function button 630 is enabled to ultimately navigate to a point to generate shipping documentation, such as postage indicia, packing slip, a shipping label, a shipping manifest, a shipment log, etcetera through operation of an appropriate one of shipping applications 131-133. Such operation may include debiting an account for the cost of the shipping services, such as to deduct an amount of postage from a secure postage value user account.

It should be appreciated that, although discussed with reference to web pages, the embodiments described above with respect to FIGS. 3-6 may be utilized to facilitate shipping functionality in association with any of a number of network sites, applications, and functions. Moreover, embodiments of the present invention may not only obtain information from such network sites, applications, and/or functions, but they may also facilitate outputting or insertion of relevant data to such sites, applications, and functions. For example, a shipping plug-in of an embodiment of the invention may operate to cause a "shipped" flag to be set, which is perhaps provided by a web page for noting shipment having been made outside of shipping functionality provided by the web page, such as through a macro manipulating an otherwise manual user interface.

Shipping functionality provided according to the embodiments of FIGS. 3-6 may be provided even where shipping functionality is otherwise already provided (e.g., providing a shipping interface button in addition to a "ship it" button or other mailing service feature native to an Internet site being visited), such as to provide shipping provider choice, facilitate use of a same account with different applications or sites, etcetera. In operation according to the embodiments of FIGS. 3-6, a user is enabled to use a same shipping account with respect to any number of applications or functions. For example, a user is enabled to use a same USPS postal account with respect to shipments associated with different vendors (e.g., eBay™, Amazon.com™, Yahoo™). Moreover, a user may select a shipping provider of preference (e.g., USPS, UPS, Federal Express, Purolator Courier, DHL, etcetera) even where the underlying application or function does not support the selected shipping provider, whether directly or indirectly.

It should be appreciated that shipping functionality provided according to embodiments of the present invention may provide features in addition to or in the alternative to identifying shipping information and facilitating the generation of shipping documents. For example, embodiments of the invention may operate to provide a shipping history or other information in association with information recognized as possibly being associated with a shipping event. For example, when address information for an entity a user has previously shipped an item to (whether appearing in the same underlying web page or application, or appearing in a wholly different context), shipping information provided by a shipping plug-in of an embodiment of the present invention may include a shipping history, tracking information, and/or the like. Additionally, embodiments of the invention may provide integrated shipping reports with respect to different shipping providers, different underlying applications, etcetera. For example, a shipping plug-in of the present invention which is utilized to provide shipping services with respect to a plurality of shipping applications and/or a plurality of web applications may be utilized to provide a consolidated report of shipping activity. Similarly, a plurality of different shipping plug-ins of the present invention which are utilized in the aggregate to provide shipping services with respect to a plurality of shipping applications and/or a plurality of web applications may interact, perhaps with a linked reporting module, to provide a consolidated report of shipping activity.

Embodiments of the invention may be facilitated in recognizing information indicative of a shipping event through the use of flags, metadata, or other information available with respect to underlying web pages or applications. For example, a content provider may wish to facilitate use of a shipping plug-in of embodiments of the invention and thus provide one or more flags in or with their content identifying information useful with respect to shipping functions.

Moreover, embodiments of the invention operate to recognize information in addition to information indicative of a shipping event being associated with an underlying web page or application. For example, a shipping plug-in of embodiments of the invention may parse information to identify other information useful with respect to shipping functions, such as item size, item weight, package size, package weight, value of items, etcetera. This information may be utilized in automatically populating shipping options according to embodiments of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

providing one or more browser plug-in operating upon a host computer system, adapted to integrate with a browser and provide shipping functions with respect to a plurality of applications operable through a browser user interface provided by the browser;

controlling the browser to interact with a selected application of the plurality of applications;

analyzing, by the one or more browser plug-in, information of a web page displayed to a user through the browser user interface in association with the interaction with the selected application to identify information indicative of a possible shipping event associated with the selected application, wherein the analyzing occurs subsequent to display of the web page via the browser user interface, wherein the analyzing comprises:

identifying a source of the web page; and accessing a database to identify the shipping information on the web page based on the source of the web page, wherein the database stores information indicating where shipping information is presented on web pages associated with different sources of the web pages;

adding an aspect of a shipping user interface to the browser user interface as a function of the one or more browser plug-in having identified information indicative of the possible shipping event, the aspect of the shipping user interface providing one or more shipping function selection elements configured to invoke a corresponding shipping function for the possible shipping event which is not otherwise available through the browser user interface in association with the browser interacting with the selected application; and generating shipping documentation for the possible shipping event in response to the user selecting one of the one or more shipping function selection elements to thereby enable the user to control, from within the browser user interface, the shipping function to generate the shipping documentation not otherwise available through the browser user interface in association with the browser interacting with the selected application.

2. The method of claim 1, wherein the analyzing comprises:

parsing the information for address information shipping information, or both.

3. The method of claim 1, wherein the analyzing comprises:

recognizing information of web page associated with a shipping provider based on data included in a database; and determining that the possible shipping event is associated with the web page based on the recognizing.

4. The method of claim 1, wherein the analyzing comprises:

running a script associated with the selected application.

5. The method of claim 1, wherein the analyzing comprises:

analyzing uniform resource locator information associated with the selected application.

6. The method of claim 1, wherein the adding an aspect of a shipping user interface to the browser user interface comprises:

altering a page displayed by the browser user interface to include a shipping function button therein, wherein the shipping function button provides selectable control of the shipping function which is not otherwise available through the browser user interface in association with the browser interacting with the selected application.

7. The method of claim 1, wherein the adding an aspect of a shipping user interface to the browser user interface comprises:

opening a shipping function frame in the browser user interface, wherein the shipping function frame provides selectable control of the shipping function which is not otherwise available through the browser user interface in association with the browser interacting with the selected application.

8. The method of claim 1, wherein the adding an aspect of a shipping user interface to the browser user interface comprises:

opening a dialog box, wherein the dialog box provides selectable control of the shipping function which is not otherwise available through the browser user interface in association with the browser interacting with the selected application.

9. The method of claim 1, wherein the aspect of a shipping user interface to the browser user interface comprises:

enabling a shipping function button in a control area of the browser, wherein the shipping function button provides selectable control of the shipping function which is not otherwise available through the browser user interface in association with the browser interacting with the selected application.

10. The method of claim 1, wherein the generating shipping documentation for the possible shipping event comprises:

providing at least a portion of the information indicative of the possible shipping event to a shipping application to perform the shipping function which is not otherwise available through the browser user interface in association with the browser interacting with the selected application.

11. The method of claim 1, further comprising:

providing information associated with a shipping event to the selected application by the one or more browser plug-in.

12. The method of claim 11, wherein the information associated with the shipping event comprises shipping event context information.

13. The method of claim 12, wherein the shipping event context information comprises an item shipped.

14. The method of claim 12, further comprising:

storing the shipping event context information in association with shipping account information.

15. The method of claim 1, wherein the adding an aspect of the shipping user interface to the browser user interface comprises:

providing a shipping user interface for presenting the aspect of the shipping user interface and at least a portion of the information associated with the possible shipping event to the user.

16. The method of claim 1, wherein the adding an aspect of the shipping user interface to the browser user interface comprises:

providing a shipping user interface including the aspect of the shipping user interface for enabling selectable control of at least a portion of the shipping functions.

17. The method of claim 1, wherein the shipping documentation comprises a postage indicium.

18. The method of claim 1, further comprising charging an amount to an account of a plurality of accounts of a shipper, the amount corresponding to a payment for shipping an item bearing the shipping documentation.

19. The method of claim 18, wherein the account is a United States Postal Service account.

20. A non-transitory computer-readable medium storing instructions that, when executed by one or more processors, cause the one or more processors to perform operations comprising:

analyzing, by one or more browser plug-ins, information of a web page displayed to a user through a browser user interface in association with interaction with a selected application to identify information indicative of a possible shipping event associated with the selected application, the one or more browser plug-ins configured to integrate with the browser and provide shipping functions with respect to a plurality of applications operable through the browser user interface provided by the browser, wherein the analyzing occurs subsequent to display of the web page via the browser user interface and comprises:

identifying a source of the web page; and accessing a database to identify the shipping information on the web page based on the source of the web page, wherein the database stores information indicating where shipping information is presented on web pages associated with different sources of the web pages;

adding, by the one or more browser plug-ins, an aspect of a shipping user interface to the browser user interface as a function of the one or more browser plug-in having identified information indicative of the possible shipping event, the aspect of the shipping user interface providing one or more shipping function selection elements configured to invoke a corresponding shipping function for the possible shipping event which is not otherwise available through the browser user interface in association with the browser interacting with the selected application; and generating shipping documentation for the possible shipping event in response to the user selecting one of the one or more shipping function selection elements to thereby enable the user to control, from within the browser user interface, the shipping function to generate the shipping documentation not otherwise available through the browser user interface in association with the browser interacting with the selected application.

21. The non-transitory computer-readable medium of claim 20, wherein the adding an aspect of a shipping user interface to the browser user interface comprises:

altering a page displayed by the browser user interface to include a shipping function button therein, wherein the shipping function button provides selectable control of the shipping function which is not otherwise available through the browser user interface in association with the browser interacting with the selected application.

22. The non-transitory computer-readable medium of claim 20, wherein the adding an aspect of a shipping user interface to the browser user interface comprises:

opening a shipping function frame in the browser user interface, wherein the shipping function frame provides selectable control of the shipping function which is not otherwise available through the browser user interface in association with the browser interacting with the selected application.

23. The non-transitory computer-readable medium of claim 20, wherein the adding an aspect of a shipping user interface to the browser user interface comprises:

opening a dialog box, wherein the dialog box provides selectable control of the shipping function which is not otherwise available through the browser user interface in association with the browser interacting with the selected application.

24. The non-transitory computer-readable medium of claim 20, wherein the an aspect of a shipping user interface to the browser user interface comprises:

enabling a shipping function button in a control area of the browser, wherein the shipping function button provides selectable control of the shipping function which is not otherwise available through the browser user interface in association with the browser interacting with the selected application.

25. The non-transitory computer-readable medium of claim 20, wherein the generating shipping documentation for the possible shipping event comprises:

providing at least a portion of the information indicative of the possible shipping event to a shipping application to perform the shipping function which is not otherwise available through the browser user interface in association with the browser interacting with the selected application.

26. The non-transitory computer-readable medium of claim 20, further comprising charging an amount to an account of a plurality of accounts of a shipper, the amount corresponding to a payment for shipping an item bearing the shipping documentation.

27. The non-transitory computer-readable medium of claim 26, wherein the account is a United States Postal Service account.

28. A method comprising:

displaying a web page via a browser user interface;

subsequent to the displaying, analyzing, by a processor, information of a web page displayed to a user through a browser user interface in association with interaction with a selected application to identify information indicative of a possible shipping event associated with the selected application, wherein the analyzing occurs subsequent to display of the web page via the browser user interface and comprises:

identifying a source of the web page; and accessing a database to identify the shipping information on the web page based on the source of the web page, wherein the database stores information indicating where shipping information is presented on web pages associated with different sources of the web gages;

adding, by the processor, an aspect of a shipping user interface to the browser user interface as a function of having identified information indicative of the possible shipping event, the aspect of the shipping user interface providing one or more shipping function selection elements configured to invoke a corresponding shipping function for the possible shipping event which is not otherwise available through the browser user interface in association with the browser interacting with the selected application, wherein the aspect of the shipping user interface is displayed concurrently with the information of the web page; and generating, by the processor, shipping documentation for the possible shipping event in response to the user selecting one of the one or more shipping function selection elements to thereby enable the user to control, from within the browser user interface, the shipping function to generate the shipping documentation not otherwise available through the browser user interface in association with the browser interacting with the selected application.

29. The method of claim 28, further comprising charging an amount to an account of a plurality of accounts of a shipper, the amount corresponding to a payment for shipping an item bearing the shipping documentation.

30. The method of claim 29, wherein the account is a United States Postal Service account.

* * * * *

UNITED STATES PATENT AND TRADEMARK OFFICE
CERTIFICATE OF CORRECTION

PATENT NO. : 11,158,137 B1
APPLICATION NO. : 15/660812
DATED : October 26, 2021
INVENTOR(S) : Keith D. Bussell et al.

It is certified that error appears in the above-identified patent and that said Letters Patent is hereby corrected as shown below:

In the Claims

At Column 17, Claim number 2, Line number 13, delete "address information shipping" and replace with --address information, shipping--.
At Column 20, Claim number 28, Line number 26, delete "web gages" and replace with --web pages--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*